(12) United States Patent
Moyer (10) Patent No.: US 8,402,258 B2
(45) Date of Patent: Mar. 19, 2013

(54) DEBUG MESSAGE GENERATION USING A SELECTED ADDRESS TYPE

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 599 days.

(21) Appl. No.: 12/179,632

(22) Filed: Jul. 25, 2008

(65) Prior Publication Data

US 2010/0023735 A1 Jan. 28, 2010

(51) Int. Cl.
*G06F 9/00* (2006.01)
*G06F 11/36* (2006.01)

(52) U.S. Cl. .................................. 712/227; 714/45
(58) Field of Classification Search .................... None
See application file for complete search history.

(56) References Cited

U.S. PATENT DOCUMENTS

| | | | |
|---|---|---|---|
| 5,127,103 A | 6/1992 | Hill et al. | |
| 5,608,867 A | 3/1997 | Ishihara | |
| 5,630,049 A | 5/1997 | Cardoza et al. | |
| 5,636,374 A | 6/1997 | Rodgers et al. | |
| 5,694,706 A | 12/1997 | Penka | |
| 5,913,923 A | 6/1999 | Dunlap et al. | |
| 6,505,309 B1 * | 1/2003 | Okabayashi et al. | 714/35 |
| 6,601,189 B1 | 7/2003 | Edwards et al. | |
| 6,802,031 B2 | 10/2004 | Floyd et al. | |
| 6,808,867 B2 | 10/2004 | Doshi et al. | |
| 6,862,694 B1 | 3/2005 | Tormey et al. | |
| 6,883,162 B2 | 4/2005 | Jackson et al. | |
| 6,918,065 B1 | 7/2005 | Edwards et al. | |
| 6,920,586 B1 | 7/2005 | Moyer | |
| 6,963,963 B2 | 11/2005 | Moyer | |
| 7,287,194 B2 | 10/2007 | Moyer | |
| 7,296,137 B2 | 11/2007 | Moyer | |
| 7,299,335 B2 | 11/2007 | Moyer | |
| 2002/0038437 A1 | 3/2002 | Hogdal et al. | |
| 2002/0188831 A1 | 12/2002 | Jackson et al. | |
| 2004/0221269 A1 * | 11/2004 | Ray et al. | 717/124 |
| 2005/0138484 A1 | 6/2005 | Moyer et al. | |
| 2005/0257102 A1 | 11/2005 | Moyer et al. | |
| 2006/0117224 A1 | 6/2006 | Wu | |
| 2006/0174225 A1 * | 8/2006 | Bennett et al. | 717/124 |
| 2006/0271919 A1 * | 11/2006 | Moyer | 717/136 |
| 2007/0033577 A1 | 2/2007 | Arackal | |
| 2007/0130119 A1 | 6/2007 | Phillips | |
| 2008/0215920 A1 * | 9/2008 | Mayer et al. | 714/38 |
| 2010/0023811 A1 | 1/2010 | Moyer | |
| 2010/0023812 A1 | 1/2010 | Moyer | |

FOREIGN PATENT DOCUMENTS

JP 2003271417 A * 9/2003

OTHER PUBLICATIONS

Morigaki, Toshihiko. "Information Processing Device and Electronic Equipment" Machine English translation of the above JP foreign patent document, published Sep. 2003.*
U.S. Appl. No. 12/179,631, Non-Final Office Action mailed Oct. 13, 2010, 22 pages.
PCT/US2009/041211 International Search Report and Written Opinion mailed Nov. 30, 2009 on Corresponding Application.
Non-Final Office Action mailed Aug. 2, 2010 in U.S. Appl. No. 12/179,629.

* cited by examiner

*Primary Examiner* — Jacob A Petranek (57) ABSTRACT

A method for generating a debug message includes receiving a translated address and an untranslated address associated with a same processor operation, determining a value of one or more control indicators, selecting the translated address or the untranslated address as a selected address based on the value of the one or more control indicators, and creating a debug message using at least a portion of the selected address.

18 Claims, 5 Drawing Sheets

| DC1[18] | PTAS | PTAS – PROGRAM TRACE ADDRESS TYPE SELECT<br>0 – PROGRAM TRACE MESSAGE PROVIDE LOGICAL ADDRESSES<br>1 – PROGRAM TRACE MESSAGE PROVIDE PHYSICAL ADDRESSES |
|---|---|---|
| DC1[19] | DTAS | DTAS – DATA TRACE ADDRESS TYPE SELECT<br>0 – DATA TRACE MESSAGE PROVIDE LOGICAL ADDRESSES<br>1 – DATA TRACE MESSAGE PROVIDE PHYSICAL ADDRESSES |
| DC1[30:31] | TM | TM – TRACE MODE<br>00 – NO TRACE<br>1X – PROGRAM TRACE ENABLED<br>X1 – DATA TRACE ENABLED |

DEBUG MESSAGE GENERATION USING A SELECTED ADDRESS TYPE

RELATED APPLICATIONS

This application is related to my copending U.S. patent applications filed of even date herewith and assigned to the assignee hereof:
(1) U.S. Ser. No. 12/179,629 entitled "Dynamic Address-Type Selection Control In A Data Processing System"; and
(2) U.S. Ser. No. 12/179,631 entitled "Debug Trace Messaging With One Or More Characteristic Indicators".

BACKGROUND

1. Field

This disclosure relates generally to semiconductors, and more specifically, to data processing systems that implement debug circuitry for monitoring information in the system.

2. Related Art

An IEEE standard known as IEEE ISTO5001, or the Nexus debug standard, is an established real-time debug standard that supports real-time debug message generation. The Nexus debug standard specifies a mechanism for identifying to an external trace reconstruction tool a predetermined operating condition within the system. Debugging processes are also used in the development of code for a data processing system. Providing debug information in real-time, without intrusion on the normal operation of the data processing system is highly desirable to remain transparent to operation of the system.

Debug messages are generated by the data processing system that contain address and data information for either program events (Program Trace Messaging), or data events (Data Read Messaging, Data Write Messaging), as well as other debug information. The address information is typically virtual address information which is a format that must be translated to identify a physical memory location known as a physical address. Correlation of the address to a program undergoing execution is an important part of the debugging process so that actual program flow and the dynamic values of system data variables can be monitored. Virtual to physical address mapping or translation must be performed. However, an external debugger typically does not have the necessary virtual to physical mapping information to quickly translate the address portions of the debug messages, particularly when these mappings are dynamically changing due to demand paging or other remapping operations. The use of the virtual addresses allows a debug user a straightforward way to trace a computer program via a program listing obtained by a compile and link function which uses virtual addresses for text and data sections of the software application. The user typically has no knowledge of how the virtual addresses are translated to physical addresses by an operating system (OS). Therefore, tracing is required to indicate virtual addresses. Unfortunately certain program listings are unavailable, such as program listings for pre-compiled software modules which are executed at runtime. Examples of such modules are OS calls and library functions. In such an example, no program listing is available. Thus it is very difficult to properly trace and interpret these sections of the executed program. Correct translation of a virtual address to a physical address requires knowing where a program counter is and examining physical memory to determine where the address is. For systems executing multiple programs the memory mapping varies dynamically and readily transitions between memory pages. In such situations, the address translation significantly slows debug message generation and interpretation from being performed real-time.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
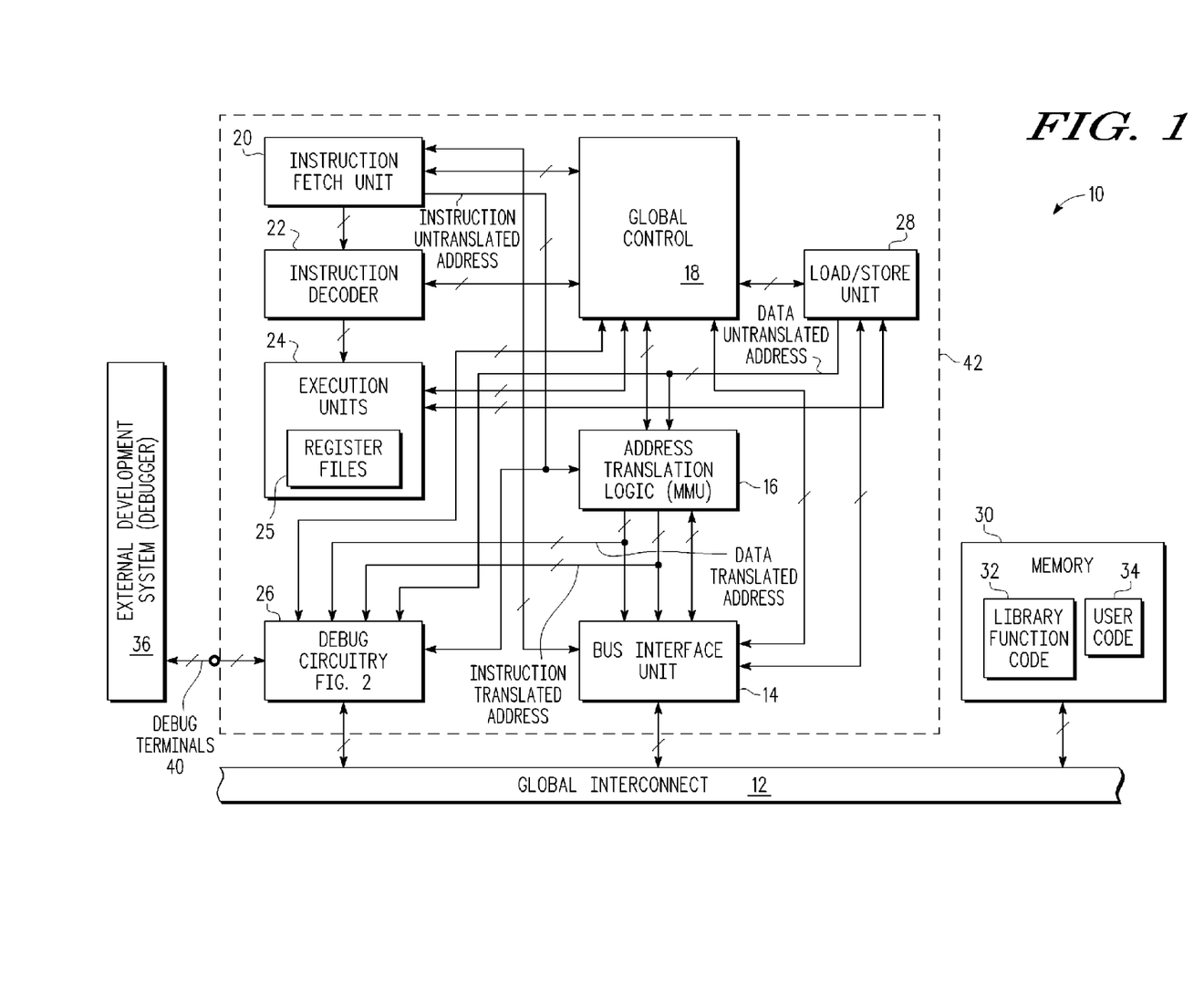
FIG. 1 illustrates in block diagram form a data processing system having debug message generation in accordance with one form of the present invention.

Illustrated in FIG. 1 is a data processing system 10 that generates debug messages having address types of a type that is dynamically selectable by user control. As used herein the term "address types" refers to various categories of address such as translated addresses versus untranslated addresses. Examples of untranslated addresses include logical addresses, virtual addresses and effective addresses. Examples of translated addresses include real addresses and physical addresses. Translated addresses may also include virtual addresses where virtual addresses have been translated from effective addresses. Within data processing system 10 is a global interconnect 12. In one form the global interconnect 12 is a system bus. Other forms of interconnect may be used including, for example, crossbars, point-to-point connections, and optical and wireless transmission techniques. A bus interface unit 14 is coupled to the global interconnect 12 via a bidirectional coupling. In one form the bidirectional coupling is a bidirectional multiple conductor bus wherein multiple conductor buses herein are represented with a slash across the conductor. The bus interface unit 14 is bidirectionally coupled to an address translation logic unit 16 which functions as a memory management unit (MMU). The address translation logic unit 16 is coupled to a first input/output terminal of a global control circuit 18 via a bidirectional multiple conductor bus. A second input/output terminal of the global control circuit 18 is coupled to a first input/output terminal of an instruction fetch unit 20 via a bidirectional multiple conductor bus. The instruction fetch unit 20 has an output coupled to an input of an instruction decoder 22 via a multiple conductor bus. An output of the instruction decoder is coupled to an input of execution units 24. In one form the execution units include at least one arithmetic logic unit, at least one floating point unit and at least one multiplier circuit. Within the execution units 24 are register files 25. An input/output terminal of instruction decoder 22 is coupled to a third input/output terminal of the global control circuit 18. An input/output terminal of execution units 24 is coupled to a fourth input/output terminal of the global control circuit 18. Debug circuitry 26 has an input/output terminal coupled to a fifth input/output terminal of the global control circuit 18. A load/store unit 28 has an input/output terminal bidirectionally coupled to a sixth input/output terminal of the global control circuit 18. The load/store unit 28 has an input coupled to a first output of the bus interface unit 14. A second output of the bus interface unit 14 is coupled to an input of the global control circuit 18. An output of the load/store unit 28 provides a data untranslated address and is coupled to a first input of the address translation logic unit 16 and a first input of the debug circuitry 26. An output of the instruction fetch unit 20 provides an instruction untranslated address and is coupled to a second input of the address translation logic unit 16 and a second input of the debug circuitry 26. A first output of the address translation logic unit 16 provides a data translated address and is coupled to a first input of the bus interface unit 14 and to a third input of the debug circuitry 26. A second output of the address translation logic unit 16 provides an instruction translated address and is coupled to a second input of the bus interface unit 14 and to a fourth input of the debug circuitry 26. A memory 30 is coupled to the global interconnect 12 via a bidirectional coupling. The memory 30 has a first portion of code that is non-user code or library function code 32. This code portion represents, for example, code for implementing specific functions or tasks and providing fixed data values. Such sets of instructions simplify work and prevent duplication of effort each time a particular task needs to be carried out. The library function code 32 prevents a programmer from having to rewrite the instructions themselves each time they are needed. The library function code 32 includes standard routines for a particular programming language. The memory 30 has a second portion of code that is user code 34 and is software provided by users of the data processing system 10. User code or programs thus differ from an operating system which runs a computer and a utility which performs maintenance or general-purpose chores. Depending upon the implementation need, user code 34 can manipulate text, numbers, graphics or a combination of these elements. Some user code offers considerable computing power by focusing on a single task such as word processing. Other user code implements less processing power but includes several applications such as, for example, word processing, spreadsheets and a database program. User code may be of any type implementing any algorithms, including real-time embedded control algorithms. Library function code 32 may also include OS code, or OS code may be located separately within memory 30 outside of library function code 32 or user code 34. The debug circuitry 26 has a second input/output terminal coupled to a plurality of debug terminals 40 via bidirectional multiple conductors. The plurality of debug terminals 40 is coupled to an external development system 36 that is commonly referred to as a debugger or external debugger. In the illustrated form the bus interface unit 14, the address translation logic unit 16, the global control circuit 18, the instruction fetch unit 20, the instruction decoder 22, the execution units 24 with register files 25, the debug circuitry and the load/store unit 28 collectively form a data processor 42 as indicated by the dashed line grouping in FIG. 1. While the global control circuit 18 is illustrated in FIG. 1 in a segregated location, it should be well understood that the circuitry and functional control of global control circuit 18 may also be implemented in a distributed manner and be included within any of the various other system blocks of data processing system 10.

In operation, the data processing system 10 communicates with devices (not shown) via the global interconnect 12. All information communicated with the data processor 42 transfers through the bus interface unit 14. The instruction fetch unit 20 retrieves data processing instructions from the bus interface unit 14 under control of the global control circuit 18. The retrieved instructions are sequentially communicated to the instruction decoder 22 for decoding under control of the global control circuit 18. The execution units 24 execute instructions and generate data that is either stored in a cache (not shown) or placed in the memory 30 via coupling through the global control circuit 18, the bus interface unit 14 and the global interconnect 12. Debugging of the operation of data processor 42 and data processing system 10 is performed by the use of debug circuitry 26 that generates debug messages for analysis by the external development system 36. A test or debug mode of operation is entered in response to activation of such from the external development system 36. In the illustrated form the debug circuitry 26 is configured to receive four different addresses which are either a data address or an instruction address. A data address is an address where data resides whereas an instruction address is an address where an instruction resides. Instruction untranslated addresses are provided from the instruction fetch unit 20 to the debug circuitry 26 and the address translation logic unit 16. An untranslated address is an address which requires some further processing or translating to obtain the address of the physical storage location where the information is residing. The address translation logic unit 16 provides instruction translated addresses to the debug circuitry 26 and bus interface unit 14. In one form the untranslated addresses may be logical addresses which are often also referred to as virtual addresses. In another form the untranslated addresses may be effective addresses. Effective addresses must first be translated into virtual addresses before being translated into physical addresses. The load/store unit 28 provides data untranslated addresses to the debug circuitry 26 and to the address translation logic unit 16. The address translation logic unit 16 provides data translated addresses to the debug circuitry 26 and bus interface unit 14. The address translation logic unit 16 operates under control of the global control circuit 18 to ensure that the debug circuitry 26 receives a translated address and an untranslated address associated with a same processor operation. In response to receiving the translated address and the untranslated address, a value of one or more control indicators or control bits is determined. Based on the value of the one or more control indicators, either the translated address or the untranslated address is chosen as a selected address. The debug circuitry then forms a debug message for the external development system 36 using at least a portion of the selected address by including a portion, if not all, of the selected address in the debug message. In one form the debug message is created by first compressing the selected address into a smaller sized selected address having fewer bits. At least a portion of the compressed selected address is then used as a portion of the debug message. The format of the debug message may vary and examples will discussed below in connection with FIGS. 5 and 6. In one form the debug message may include, in addition to at least a portion of the selected address, a field that indicates whether the selected address is the translated address or the untranslated address. The control indicators will be described in below in connection with FIG. 2. In one form a software program contained in the user code 34 and library function code 32 of memory 30 is executed. The control indicator or indicators have values that are set based upon a type of the software program being debugged. For example, if the software program is a user program (user type), the control indicator assumes a first binary value. If the software program is a non-user program (non-user type), such as certain portions of library code or OS code, the control indicator assumes an opposite second binary value. In another form the one or more control indicators in the debug circuitry 26 include a first control bit that indicates whether translated or untranslated addresses are to be used for creating a program trace debug message and a second control bit that indicates whether translated addresses or untranslated addresses are to be used for creating a data trace debug message. Specific control indicators can also be associated with whether a program trace test function is being performed or whether a data trace test function is being performed.

Figure 2:
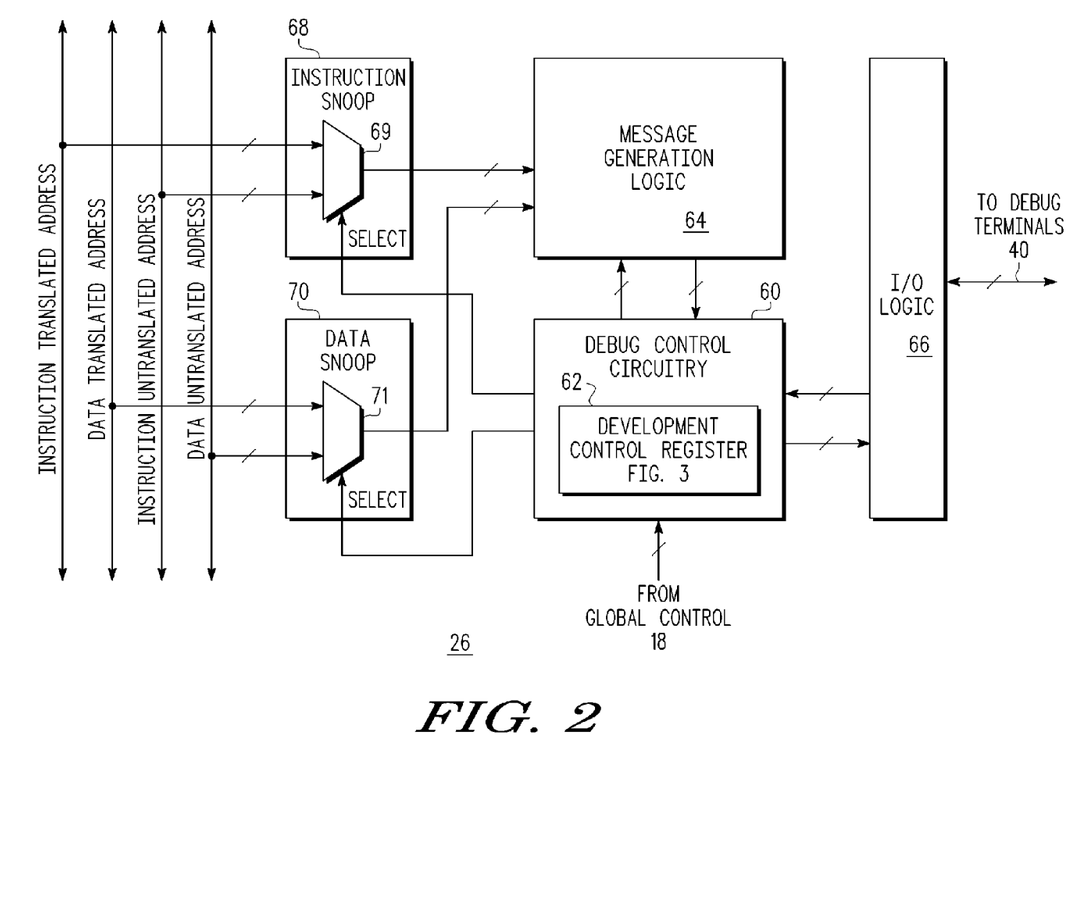
FIG. 2 illustrates in block diagram form one form of debug circuitry of FIG. 1.

Illustrated in FIG. 2 in an exemplary embodiment of a portion of the debug circuitry 26 of FIG. 1. Debug control circuitry 60 has an input/output terminal coupled to the global control circuit 18. Within the debug control circuitry 60 is a development control register 62. A first output of the debug control circuitry 60 is coupled to a first input of a message generation logic 64 for generating a debug message. An output of the message generation logic 64 is coupled to a first input of the debug control circuitry 60. A second output of the debug control circuitry 60 is coupled to an input of Input/Output (I/O) logic 66. An input/output terminal of the I/O logic 66 is coupled via bidirectional multiple conductors to the debug terminals 40. An instruction snoop circuit 68 has a multiplexor 69 having a first input coupled to the instruction translated address of FIG. 1. A second input of multiplexor 69 is coupled to the instruction untranslated address of FIG. 1. An output of multiplexor 69 is coupled to a second input of the message generation logic 64. Multiplexor 69 has a control input for receiving a first Select signal from a third output of the debug control circuitry 60. A data snoop circuit 70 has a multiplexor 71 having a first input coupled to the data translated address of FIG. 1. A second input of multiplexor 71 is coupled to the data untranslated address of FIG. 1. An output of multiplexor 71 is coupled to a second input of the message generation logic 64. Multiplexor 71 has a control input for receiving a second Select signal from a fourth output of the debug control circuitry 60.

In operation, the message generation logic 64 is the logic circuitry which implements the function of forming the debug message pursuant to a selected one of a plurality of predetermined formats. The debug message is coupled to the debug control circuitry for routing to the debug terminals 40 via the I/O logic 66. Under control of the global control circuit 18, the debug control circuitry 60 also generates two select signals. A second select signal controls multiplexor 71 of the data snoop circuit 70 and functions to select one of the translated or the untranslated data address. In one form, the translated data address is a physical address of a data operand and the untranslated data address is a logical address of the data operand. A first select signal controls multiplexor 69 of the instruction snoop circuit 68 and functions to select one of the translated or the untranslated instruction address. In one form the translated instruction address is a physical address of an instruction operand and the untranslated instruction address is a logical address of the instruction operand. The debug control circuitry 60 uses one or more control indicators in the development control register 62 to decide whether to assert or negate the first select signal and the second select signal. In one form the one or more control indicators are implemented as control bits within the development control register 62. Both select signals may or may not be asserted at the same time and are independently controlled during the test or debug mode. The following figures will further describe the development control register 62 and the control indicator encodings as well as provide exemplary debug messages.

Figure 3:
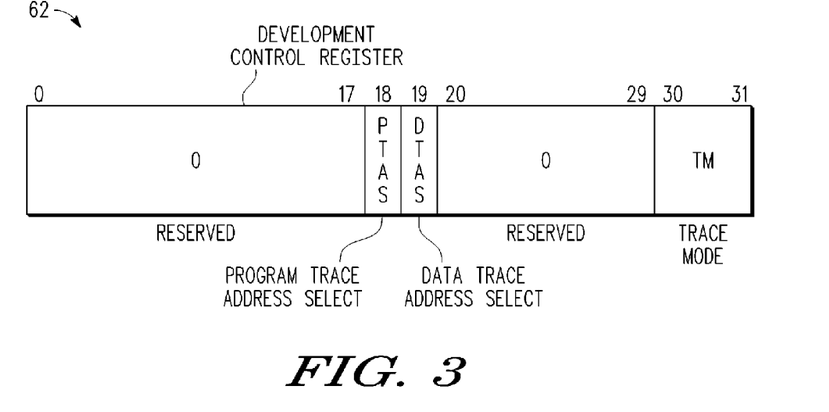
FIG. 3 illustrates in diagram form one form of a development control register of FIG. 2.

Illustrated in FIG. 3 is one example of a format of the development control register 62 of FIG. 2. The development control register 62 may be any bit size. In the illustrated form, a thirty-two bit implementation of the development control register 62 is provided. The bits zero through seventeen and bits twenty through twenty-nine are reserved. Bit eighteen is represented as a program trace address select (PTAS) control indicator or control bit. Bit nineteen is represented as a data trace address select (DTAS) control indicator or control bit. Bits thirty and thirty-one are trace mode, TM, control bits and are encoded to control modes of debug operation. In particular, the trace mode control bits control whether tracing is enabled and whether the enabled tracing is for program tracing or data tracing or for both. The PTAS control bit determines whether untranslated addresses or translated addresses for program addresses are selected. Similarly, the DTAS control bit determines whether untranslated addresses or translated addresses for data addresses are selected. The digital value of these control bits is monitored by the debug control circuitry 60 and the appropriate select signal is either enabled or not enabled depending upon their digital values. It should be well understood that the positioning of bit fields within the development control register 62 is arbitrary and may vary. Additionally, the number of control bits within each control indicator field may differ between implementations.

Figure 4:
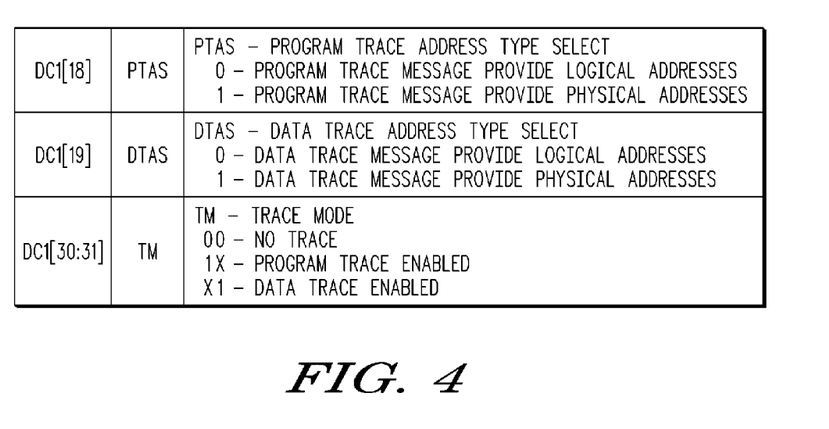
FIG. 4 illustrates in table form exemplary encodings of control fields in the development control register of FIG. 3.

Illustrated in FIG. 4 is a table that illustrates the encoding of the PTAS, DTAS and TM fields in the development control register 62 of FIG. 3. When the PTAS control indicator bit has a logic zero value the program trace messages, when enabled, provide logical address values. When the PTAS control indicator bit has a logic one value the program trace messages, when enabled, provide physical address values. When the DTAS control indicator bit has a logic zero value the data trace messages, when enabled, provide logical address values. When the DTAS control indicator bit has a logic one value the program trace messages, when enabled, provide physical address values. The table in FIG. 4 also illustrates an encoding for the trace mode control field. When the two TM control indicator bits have a value of "00" no tracing is enabled. When the two TM control indicator bits have a value of "1X", program tracing is enabled wherein "X" is a 'does not matter' value. In other words, regardless of the value of the right-most bit, the program tracing function is enabled when the left-most bit has a logic one value. When the two TM control indicator bits have a value of "X1", data tracing is enabled. In other words, regardless of the value of the left-most bit, the data tracing function is enabled when the right-most bit has a logic one value. When both control indicator bits of the TM field are a logic one, both the data tracing function and the program tracing function are enabled. It should be understood that the illustrated encoding values are exemplary only and differing encodings may be implemented.

Figure 5:
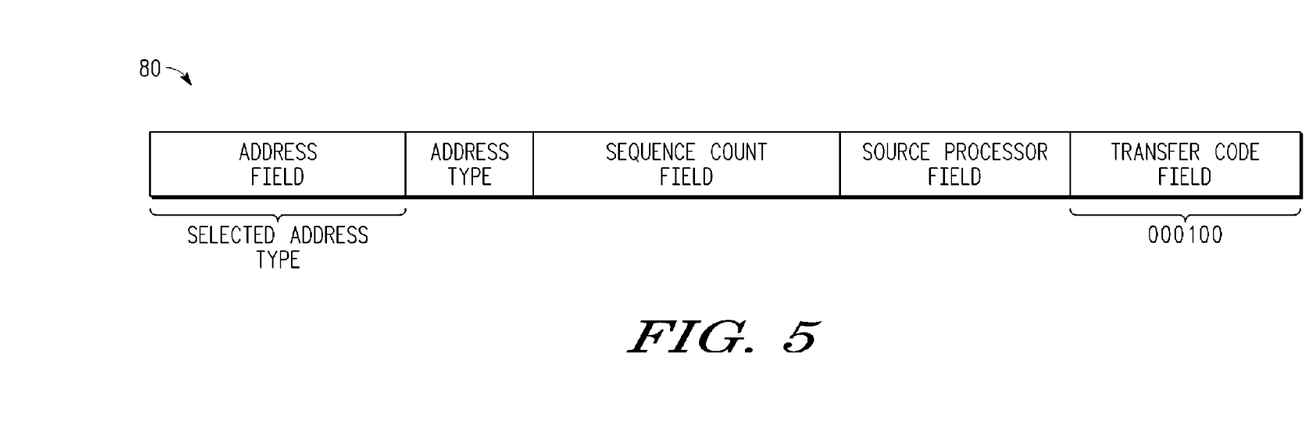
FIG. 5 illustrates in diagram form an exemplary program trace message.

Illustrated in FIG. 5 is a first exemplary trace message 80. The trace message 80 has five illustrated fields. The positioning of the fields is arbitrary. An address field contains the address of the trace message 80. The type of address in this address field is the type that was selected. A sequence count field contains a value that represents a number of instructions that has been executed since the last program trace message. A source processor field contains a value that identifies what processor that the trace message 80 is associated with. This field information is valuable in multiple processor systems. A transfer code field contains a value that identifies the trace message 80 as a program trace message having a particular predetermined field format. In the example of FIG. 5, the value that represents a program trace message with the illustrated form is "000100". An address type field is an optional field and contains an indicator of the type of address being messaged. In other words the address type field identifies whether the address field contains an address that is a virtual address or a physical address. This information, when included within the debug message, provides the trace reconstruction debug tool with the knowledge of whether a trace listing should be generated.

Figure 6:
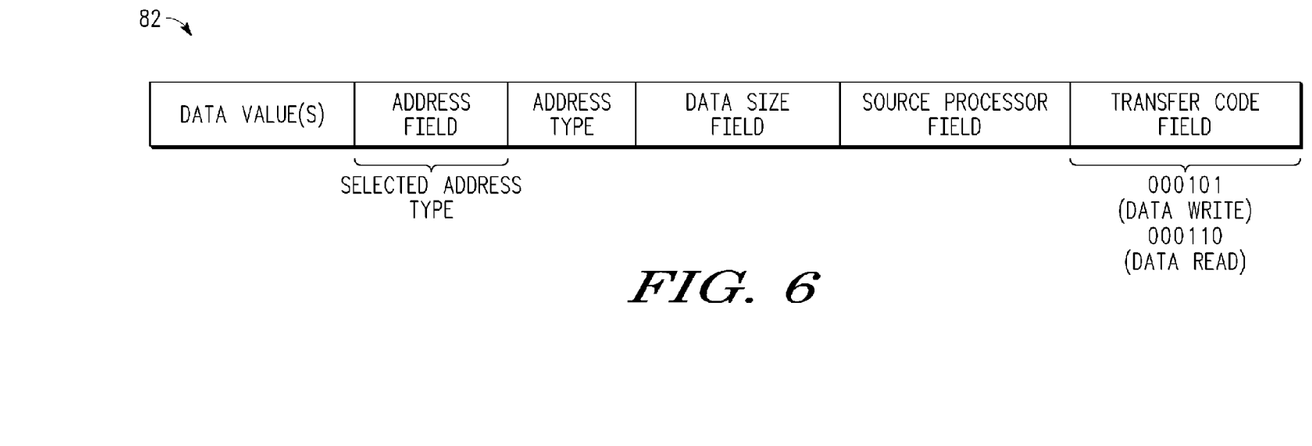
FIG. 6 illustrates in diagram form an exemplary data trace message.

Illustrated in FIG. 6 is another exemplary trace message 82. The trace message 82 has six illustrated fields. The positioning of the fields is arbitrary. A data value(s) field contains one or more data values associated with trace message 82. An address field contains the address of the trace message 82. The type of address in this address field is the type that was selected. A data size field contains a value that represents the length of the data or the number of bits contained in a data word. A source processor field contains a value that identifies what processor that the trace message 82 is associated with. This field information is valuable in multiple processor systems. A transfer code field contains a value that identifies the trace message 80 as a program trace message having a particular predetermined field format. In the example of FIG. 6, the value that represents a data write trace message with the illustrated form is "000101". The value that represents a data read trace message with the illustrated form is "000110". An address type field is an optional field and contains an indicator of the type of address being messaged. In other words the address type field identifies whether the address field contains an address that is a virtual address or a physical address. The positioning of the fields relative to each other and the bit size of each field are arbitrary and may vary between differing circuit design implementations.

By now it should be appreciated that there has been provided a data processing system having efficient real-time debug addressing. Currently implemented debug systems implementing the Nexus ISTO-5001 standard typically transfer all address information as virtual addresses. When listings are unavailable for translation to a physical address the system performance or debug capability previously was degraded. The control indicators provided herein in development control register 62 permits a user of an external debugger to specify the type of addresses to be messaged. Therefore program trace reconstruction can be effectively used to debug various types of environment regardless of the availability of program listings. The debugger may perform proper run-time profiling and performance analysis of specific library or OS functions and allow a user the ability to determine whether alternate optimizations should be performed. The programmable control indicators permit the debugger to obtain addresses of a format suitable for a specific debug task and in real-time. While the debug circuitry 26 receives both translated and untranslated addresses, the programmed control indicators permits the debug circuitry 26 to select which address is to be used in generating a debug trace message. Additionally, independent control of the address format exists for program debug tracing and data debug tracing.

Because the various apparatus implementing the present invention are, for the most part, composed of electronic components and circuits known to those skilled in the art, circuit details have not been explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary memory system architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

In one form there is herein provided a method for generating a debug message. A translated address and an untranslated address associated with a same processor operation are received. A value of one or more control indicators is determined. Based on the value of the one or more control indicators, the translated address or the untranslated address is selected as a selected address. A debug message is created using at least a portion of the selected address. In one form the debug message is created by including the at least a portion of the selected address in the debug message. In another form the at least a portion of the selected address is compressed. At least a portion of the compressed selected address is included in the debug message. In another form the debug message is created by including a field in the debug message which indicates whether the selected address is the translated address or the untranslated address. In another form a software program is executed and the value of the one or more control indicators is set based on a type of the software program. In another form the type of the software program is a user type or a non-user type. In another form the untranslated address is a virtual address and the translated address is a physical address. In another form the debug message is created by including a field in the debug message which indicates whether the selected address is the translated address or the untranslated address. In another form the one or more control indicators include a first control indicator which indicates whether translated addresses or untranslated addresses are to be used for creating a program trace debug message and a second control indicator which indicates whether translated addresses or untranslated addresses are to be used for creating a data trace debug message. In another form the determining the value of the one or more control indicators includes determining a value of the first control indicator when performing a program trace and determining a value of the second control indicator when performing a data trace. In yet another form the debug message is a program trace debug message when performing the program trace, and the debug message is a data trace debug message when performing the data trace.

Figure 7:
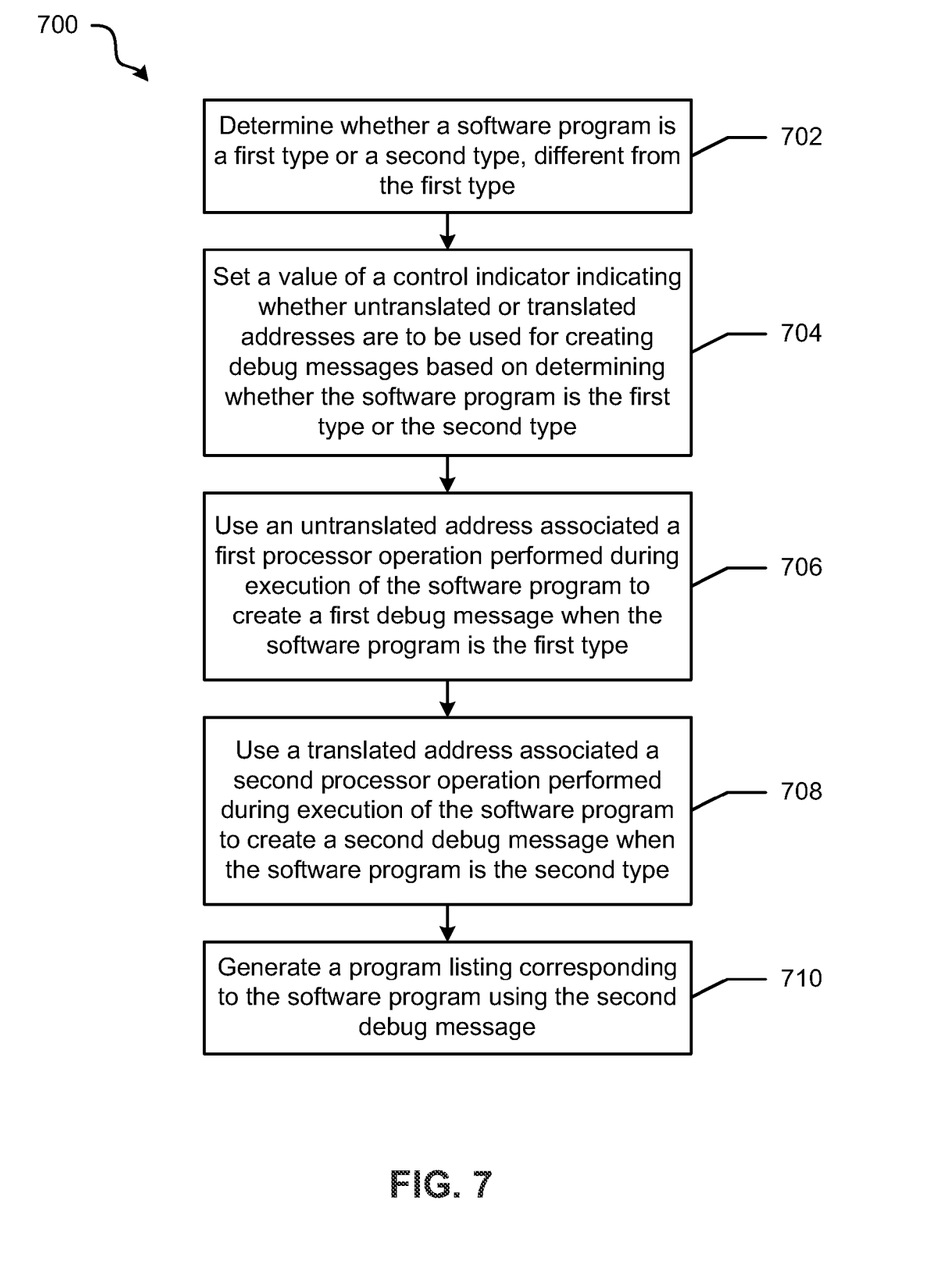
FIG. 7 illustrates in diagram form a method for debugging a software program.

In another form there is herein provided a method 700 for debugging a software program. A determination is made whether the software program is a first type or a second type, different from the first type at block 702. In another form based on the determination of whether the software program is the first type or the second type, a value of a control indicator indicating whether untranslated or translated addresses are to be used for creating debug messages is set at block 704. When the software program is the first type, an untranslated address associated with a first processor operation performed during execution of the software program is used rather than a translated address associated with the first processor operation to create a first debug message at block 706. When the software program is the second type, a translated address associated with a second processor operation performed during execution of the software program is used rather than an untranslated address associated with the second processor operation to create a second debug message at block 708. In another form the first type is characterized as one of a user program type or a non-user program type and the second type is characterized as another one of the user program type or the non-user program type. In yet another form the first type is characterized as a user program type and the second type is characterized as a non-user program type. In another form the second debug message is used to generate a program listing corresponding to the software program. In another form when the software program is the first type, the first debug message includes at least a portion of the untranslated address associated with the first processor operation or at least a portion of a compressed version of the untranslated address associated with the first processor operation at block 710. When the software program is the second type, the second debug message includes at least a portion of the translated address associated with the second processor operation or at least a portion of a compressed version of the translated address associated with the second operation.

In another form there is herein provided a data processing system having processor circuitry which performs a plurality of processor operations, each of the plurality of processor operations having an associated untranslated address. Address translation logic translates the associated untranslated addresses to translated address. Each of the plurality of processor operations has an associated translated address. Debug circuitry generates debug messages corresponding to each of at least a subset of the plurality of processor operations, wherein each debug message is generated using an untranslated address associated with a corresponding processor operation of the at least a subset of the plurality of processor operations when a control indicator has a first value and a translated address associated with the corresponding processor operation of the at least a subset of the plurality of processor operations when the control indicator has a second value, different from the first value. In one form for each debug message, the debug circuitry includes at least a portion of a compressed version of the untranslated address when the control indicator has the first value and at least a portion of a compressed version of the translated address when the control indicator has a second value. In another form for each debug message, the debug circuitry further includes an indicator field indicating whether the debug message includes the at least a portion of the compressed version of the untranslated address or the at least a portion of the compressed version of the translated address.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Computer readable media used to implement the described structure and functions may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, data processing system 10 is implemented in a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

Although the invention is described herein with reference to specific embodiments, various modifications and changes can be made without departing from the scope of the present invention as set forth in the claims below. For example, any type of memory module having two or more integrated circuit chips may be used. Typically each memory module will have a common support structure, such as a printed circuit board, but that is not required. Various type of memory circuits may be used to implement the cache and various register storage devices may be used to implement the described FIFOs. Other storage devices in addition to a FIFO may be used. For example, in some protocols a single, register storage could be implemented. In other embodiments a LIFO, last-in first-out storage device could be used. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for generating a debug message, the method comprising:
   receiving a translated address and an untranslated address associated with a same processor operation;

setting a value of one or more control indicators based on whether the translated address or the untranslated address is to be used for creating a program trace debug message and whether the translated address or the untranslated address is to be used for creating a data trace debug message;

based on the value of the one or more control indicators, selecting the translated address or the untranslated address as a selected address; and creating a debug message using at least a portion of the selected address, wherein the debug message includes a field indicating whether the untranslated address or the translated address is selected for the debug message.

2. The method of claim 1, wherein the creating the debug message comprises including the at least a portion of the selected address in the debug message.

3. The method of claim 1, wherein the creating the debug message comprises:

compressing the at least a portion of the selected address to form a compressed selected address; and including at least a portion of the compressed selected address in the debug message.

4. The method of claim 1, further comprising:

executing the software program.

5. The method of claim 4, wherein the type of the software program is a user type or a non-user type.

6. The method of claim 1, wherein the untranslated address comprises a virtual address and the translated address comprises a physical address.

7. The method of claim 1, wherein the setting the value of the one or more control indicators comprises setting a value of the first control indicator when performing a program trace and setting a value of the second control indicator when performing a data trace.

8. The method of claim 7, wherein the debug message is a program trace debug message when performing the program trace and the debug message is a data trace debug message when performing the data trace.

9. A method for debugging a software program, the method comprising:

determining a set of control indicators;

when the control indicators are in a first state, using an untranslated address associated with a first processor operation performed during execution of the software program rather than a translated address associated with the first processor operation to create a first debug message, and including a field in the first debug message indicating whether the untranslated address or the translated address is selected for the first debug message; and when the control indicators are in a second state, using a translated address associated with a second processor operation performed during execution of the software program rather than an untranslated address associated with the second processor operation to create a second debug message, and including a field in the second debug message indicating whether the untranslated address or the translated address is selected for the second debug message.

10. The method of claim 9, wherein the first type is characterized as one of a user program type or a non-user program type and the second type is characterized as another one of the user program type or the non-user program type.

11. The method of claim 10, wherein the first type is characterized as a user program type and the second type is characterized as a non-user program type.

12. The method of claim 9, further comprising:

based on determining whether the software program is the first type or the second type, setting a value of a control indicator indicating whether untranslated or translated addresses are to be used for creating debug messages.

13. The method of claim 9, further comprising:

using the second debug message to generate a program listing corresponding to the software program.

14. The method of claim 9, wherein when the software program is the first type, the first debug message includes at least a portion of the untranslated address associated with the first processor operation or at least a portion of a compressed version of the untranslated address associated with the first processor operation, and when the software program is the second type, the second debug message includes at least a portion of the translated address associated with the second processor operation or at least a portion of a compressed version of the translated address associated with the second processor operation.

15. A data processing system, comprising:

processor circuitry which performs a plurality of processor operations, each of the plurality of processor operations having an associated untranslated address;

address translation logic which translates the associated untranslated address to a translated address, such that each of the plurality of processor operations has an associated translated address; and debug circuitry which sets a value of a control indicator, and generates debug messages corresponding to each of at least a subset of the plurality of processor operations, wherein each debug message is generated using an untranslated address associated with a corresponding processor operation of the at least a subset of the plurality of processor operations when the control indicator has the first value and a translated address associated with the corresponding processor operation of the at least a subset of the plurality of processor operations when the control indicator has the second value, different from the first value, wherein each debug message includes a field indicating whether the untranslated address or the translated address is selected for that debug message.

16. The data processing system of claim 15, wherein, for each debug message, the debug circuitry includes at least a portion of a compressed version of the untranslated address when the control indicator has the first value and at least a portion of a compressed version of the translated address when the control indicator has a second value.

17. The data processing system of claim 16, wherein, for each debug message, the debug circuitry further includes an indicator field indicating whether that debug message includes the at least a portion of the compressed version of the untranslated address or the at least a portion of the compressed version of the translated address.

18. The data processing system of claim 15, wherein the debug circuitry generates a program listing based on information from the field, in each debug message, indicating whether the untranslated address or the translated address is selected for that debug message.

\* \* \* \* \*